United States Patent
Voigt

(10) Patent No.: US 10,071,616 B2
(45) Date of Patent: Sep. 11, 2018

(54) CARDAN MOUNTING FOR AN AIR VENT

(71) Applicant: FORD GLOBAL TECHNOLOGIES, LLC, Dearborn, MI (US)

(72) Inventor: Torsten Voigt, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 14/704,149

(22) Filed: May 5, 2015

(65) Prior Publication Data
US 2015/0336446 A1 Nov. 26, 2015

(30) Foreign Application Priority Data
May 20, 2014 (DE) .................. 10 2014 209 479

(51) Int. Cl.
*B60H 1/34* (2006.01)
*F16D 3/28* (2006.01)
*F16D 3/40* (2006.01)
*F16D 3/42* (2006.01)

(52) U.S. Cl.
CPC .......... *B60H 1/3435* (2013.01); *B60H 1/3442* (2013.01); *F16D 3/28* (2013.01); *F16D 3/40* (2013.01); *F16D 3/42* (2013.01); *B60H 2001/3464* (2013.01)

(58) Field of Classification Search
CPC .. B60H 1/3414; B60H 1/3428; B60H 1/3435; B60H 1/3442; B60H 1/345; F16D 3/28
USPC ........................... 454/154, 319, 152, 151, 76
See application file for complete search history.

(56) References Cited

U.S. PATENT DOCUMENTS

| 4,901,402 A | 2/1990 | Begemann |
| 5,575,715 A * | 11/1996 | Norbury, Jr. ......... B60H 1/3442 454/286 |
| 5,947,813 A | 9/1999 | Chow et al. |

FOREIGN PATENT DOCUMENTS

| DE | 19701499 C1 | 12/1997 |
| DE | 102011122426 A1 | 6/2012 |
| EP | 2340178 B1 | 7/2013 |

OTHER PUBLICATIONS

English translation for EP2340178.
English Machine Translation of DE102011122426A1.
English Machine Translation of DE19701499C1.

\* cited by examiner

*Primary Examiner* — Vivek Shirsat
(74) *Attorney, Agent, or Firm* — Vichit Chea; King & Schickli, PLLC

(57) ABSTRACT

The invention relates to a cardan mounting for an air vent, comprising a fixed part and a moving part, which are each pivotably attached to a cardan ring, wherein the two pivoting axes are arranged at right angles to one another. The cardan ring is elastically deformable, circular-ring-shaped in the uninstalled state and extended along one pivoting axis and compressed along the other pivoting axis, as compared with the circular shape, in the installed state. The invention furthermore relates to an air vent having a cardan mounting of this kind.

18 Claims, 7 Drawing Sheets

CARDAN MOUNTING FOR AN AIR VENT

TECHNICAL FIELD

The present invention relates to a cardan mounting for an air vent and to an air vent for guiding an air stream out of an air feed line in a heating, ventilation or air-conditioning system, particularly for passenger compartments in motor vehicles.

BACKGROUND

As is known, cardan mountings serve the purpose of mounting a first, e.g. fixed, part in relation to a second part, e.g. a part that can be moved relative to the first part, in such a way that an angular displacement between the two parts can take place virtually unhindered as long as frictional forces remain negligible. For this purpose, the two parts are each attached pivotably to at least one cardan ring, for example, wherein the two pivoting axes are arranged at right angles to one another.

Various air vents for guiding an air stream, which are used in heating, ventilation or air-conditioning systems, particularly for passenger compartments in motor vehicles, for example, are furthermore already known from the prior art. The air vents are fitted in an air duct or an air feed line and usually comprise a housing having a front air outflow opening and a rear air inflow opening and an insert, which is arranged in the housing and by means of which the direction and/or the intensity of the air stream emerging from the air vent can be modified. An air vent of this kind is disclosed in EP 2 340 178 B1, for example.

Supporting the insert of an air vent of this kind in the housing of the air vent, e.g. by means of a cardan mounting, allowing the insert to be moved into virtually any desired angular position relative to the housing in order in this way to enable the direction of the air stream emerging from the air vent to be determined, is furthermore likewise known. In addition, a further adjusting means, e.g. in the form of an adjusting wheel, by means of which the intensity of the air stream emerging from the air vent can also be controlled, is often provided on the front side of the air vent. However, this results in a relatively complex internal structure of air vents of this kind, taking up a relatively large overall volume and/or significantly restricting the options for arranging the adjusting means on the air vent.

Given this situation, it is the underlying object of the present invention to provide a cardan mounting, in particular for an air vent for use in passenger compartments of motor vehicles, which has a structure that is as simple and compact as possible and which, at the same time, requires a small number of components, thus making it possible to achieve savings both as regards the weight of the mounting and also as regards the time for assembly. The cardan mounting should furthermore have damping, such that the ventilation nozzle remains in a position set by the user. The intention is furthermore to provide an air vent that has a compact structure and furthermore facilitates arrangement of an adjusting means for controlling the intensity of the air stream emerging from the air vent.

SUMMARY

This object is achieved by a cardan mounting and an air vent having the features of the following claims. Further, particularly advantageous embodiments of the invention are disclosed by the respective dependent claims.

It should be noted that the features presented individually in the claims can be combined with one another in any technically meaningful way and give rise to further embodiments of the invention. The description additionally characterizes and specifies the invention, in particular in conjunction with the figures.

According to the invention, a cardan mounting, in particular for an air vent for guiding an air stream out of an air feed line in a heating, ventilation or air-conditioning system, particularly for passenger compartments in motor vehicles, comprises a fixed part, e.g. a housing, and a moving part, e.g. an insert, which is arranged in the housing and by means of which the direction and/or the intensity of the air stream emerging from the air vent can be modified. The fixed and the moving part are each pivotably attached to a cardan ring, wherein the two pivoting axes are arranged at right angles to one another. Moreover, the cardan ring according to the present invention is elastically deformable. In the uninstalled state, i.e. in a state in which there are no external forces acting on the cardan ring, it has an uninstalled and therefore undeformed shape.

In the uninstalled state, the cardan ring preferably has a circular ring shape. However, any other shape—square, polygonal or oval—which enables it to perform the cardan-type function is also conceivable.

In the case of the rotationally symmetrical shape of the cardan ring, it is, in contrast, extended along one pivoting axis and compressed along the other pivoting axis, as compared with the circular shape, in the installed state, i.e. when the first and second parts are attached to the cardan ring. In other words, the elastically deformable cardan ring assumes an essentially slightly elliptical shape in the installed state, in which external forces act upon it. At the bearing locations, this deformation gives rise to a preload between the cardan ring and the first and second parts, causing a certain damping of the rotary motion of the parts relative to the cardan ring, depending on the embodiment of the bearing region.

The rotationally symmetrical, circular-ring-shaped construction of the cardan ring ensures that the forces, e.g. frictional forces, which occur in the bearing locations at which the two parts are pivotably attached to the cardan ring, are balanced out after the (slight) deformation. In other words, after assembly the elastically deformable cardan ring automatically ensures uniform distribution of the forces, in particular frictional forces, acting in all the bearing locations by virtue of its symmetrical construction, and hence the cardan mounting according to the invention allows angular displacement of the two parts attached to the cardan ring relative to one another in a manner which is unhindered and smooth but nevertheless damped by the preload. It is thereby possible overall to simplify the structure of the cardan mounting since production-related component tolerances of the fixed part and/or of the moving part can be balanced out by the elastically deformable cardan ring.

As regards deformation, all other cardan rings, however configured, also behave in the manner described above for the circular-ring-shaped cardan ring.

According to an advantageous embodiment of the invention, the fixed part or the moving part causes the extension or the compression of the cardan ring in the installed state. This means that the forces required to deform the cardan ring in the installed state are applied exclusively by the fixed part or the moving part, thereby making it possible to reduce to a minimum the number of components required for the cardan mounting, namely the cardan ring, the fixed part and the moving part. Moreover, selective influencing of the extent of extension or compression of the cardan ring is possible by way of the diametric spacing of the bearing locations, provided for attachment to the cardan ring, of the fixed part or of the moving part.

Another advantageous embodiment of the invention envisages that the fixed part and the moving part both engage in the cardan ring from the inside. In this case, one of the two parts preferably causes extension of the cardan ring and thereby gives rise to a preloading force, opposed to the direction of extension, in the bearing locations provided for pivotable attachment to the cardan ring. Owing to the symmetrical construction of the cardan ring, the same preloading force is also obtained for the other part at the bearing locations thereof.

An alternative embodiment of the invention envisages that the fixed part and the moving part both engage in the cardan ring from the outside. In this case, one of the two parts preferably causes compression of the cardan ring and thereby gives rise to a preloading force, opposed to the direction of compression, in the bearing locations provided for pivotable attachment to the cardan ring. Owing to the symmetrical construction of the cardan ring, the same preloading force is also obtained for the other part at the bearing locations thereof.

According to another advantageous embodiment of the invention, the fixed part and the moving part each engage in the cardan ring by means of pivots. The pivots represent a possible embodiment of the respective bearing locations of the two parts and engage in corresponding apertures in the cardan ring. Owing to the elastic deformation of the cardan ring in the installed state and the preloading forces caused thereby at the bearing locations, no additional means of securing the pivots from sliding out of the corresponding apertures of the cardan ring is required, thereby further simplifying the construction of the cardan mounting and reducing the number of components required to implement the cardan mounting.

According to another aspect of the present invention, an air vent for guiding an air stream out of an air feed line in a heating, ventilation or air-conditioning system, particularly for passenger compartments in motor vehicles, is provided, comprising a housing having a front air outflow opening and a rear air inflow opening and an insert, which is arranged in the housing and by means of which the direction and/or the intensity of the air stream emerging from the air vent can be modified. According to the invention, the insert is supported in the housing by means of a cardan mounting in accordance with one of the embodiments according to the invention which have been described above.

Another advantageous embodiment of the air vent according to the invention envisages that, in a front central region, the insert has an adjusting means for controlling the intensity of the air stream emerging from the air vent.

BRIEF DESCRIPTION OF THE DRAWING FIGURES

Further features and advantages of the invention will become apparent from the following description of an illustrative embodiment of the invention, not to be taken as restrictive, which is explained in greater detail below with reference to the drawing. In said drawing, which is schematic:

DETAILED DESCRIPTION

In the various figures, identical parts are always provided with the same reference signs, and they are therefore generally also described only once.

Figure 1:
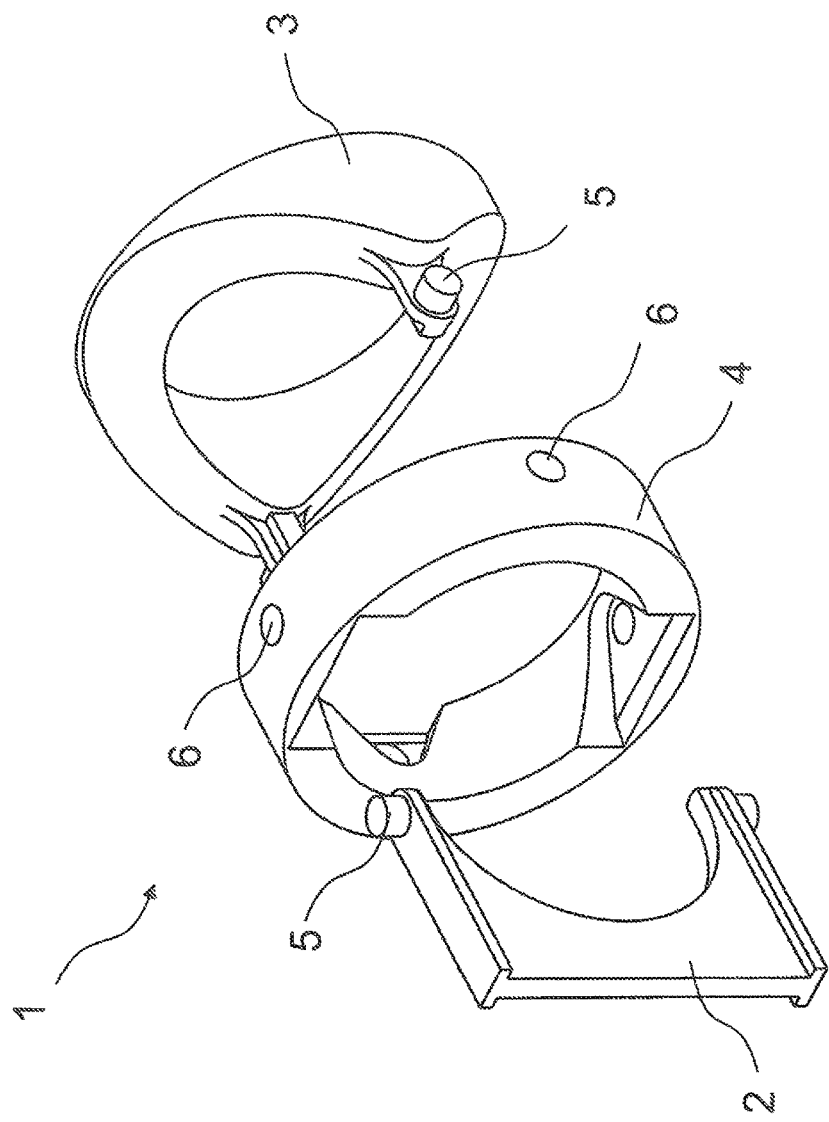
FIG. 1 shows an isometric view of a first illustrative embodiment of a cardan mounting according to the invention before assembly.

FIG. 1 represents schematically an isometric view of a first illustrative embodiment of a cardan mounting 1 according to the invention before assembly. The cardan mounting 1 shown comprises a fixed part 2, e.g. a fixed part connected to a housing (not shown) of an air vent (likewise not shown), and a moving part 3, e.g. an insert, which is arranged in the housing and is used to modify the direction and/or the intensity of the air stream emerging from the air vent. Parts 2 and 3 are each attached pivotably to a cardan ring 4. As is apparent, the two pivoting axes of parts 2 and 3 are arranged at right angles to one another. It can furthermore be seen in FIG. 1 that the cardan ring 4 has a circular ring shape, i.e. a substantially rotationally symmetrical configuration, in the unloaded state before assembly.

In the first illustrative embodiment of the cardan mounting 1, which is shown in FIG. 1, both the fixed part 2 and the moving part 3 engage in the cardan ring 4 from the inside. For this purpose, both parts 2 and 3 have pivots 5 at the bearing locations thereof, which are provided for pivotable attachment to the cardan ring 4, said pivots each engaging in corresponding apertures 6 in the cardan ring 4 after assembly of the cardan mounting 1.

Figure 2:
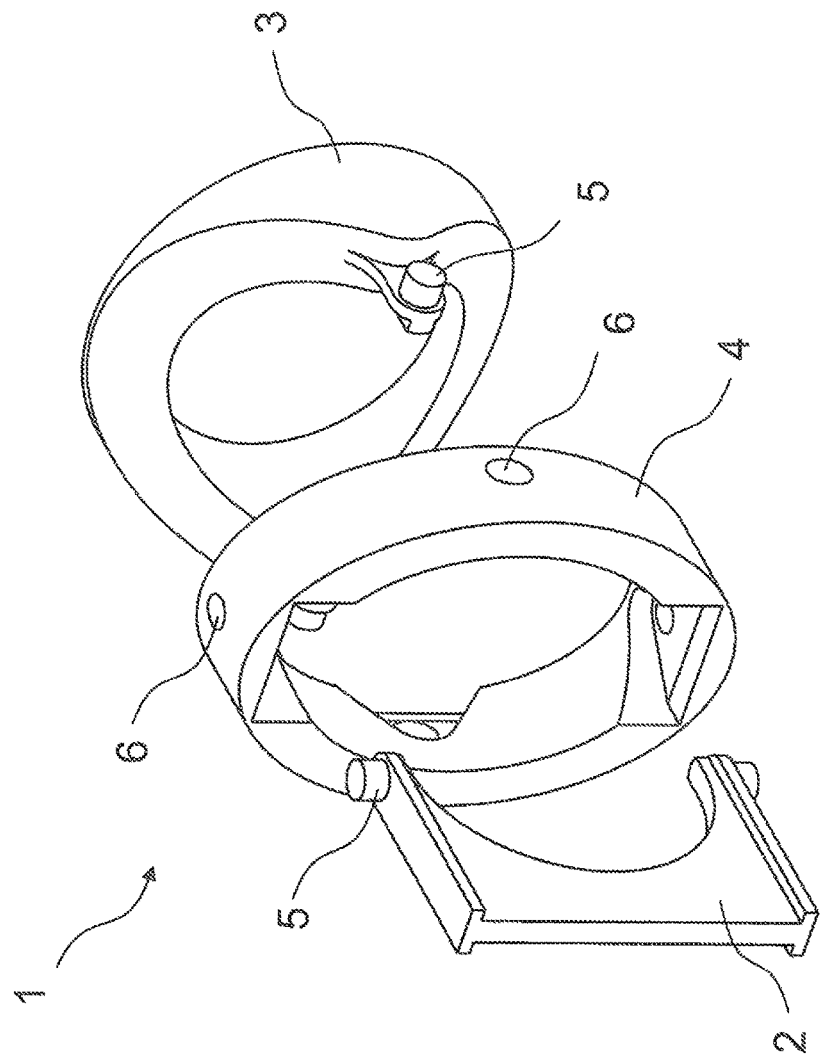
FIG. 2 shows an isometric exploded view of the cardan mounting shown in FIG. 1 after assembly.

FIG. 2 represents an isometric exploded view of the cardan mounting 1 shown in FIG. 1, after assembly. It is apparent that, after assembly, i.e. after the two parts 2 and 3 have been mounted on the cardan ring 4, the cardan ring 4 is extended along the pivoting axis of the fixed part 2 and compressed along the pivoting axis, at right angles thereto, of the moving part 3, as compared with the circular shape, illustrated in FIG. 1, of the cardan ring 4. As a particularly preferred option, the fixed part 2 in the illustrative embodiment of the cardan mounting 1 which is shown in FIG. 2 causes the extension of the cardan ring 4 in the direction of the pivoting axis of the fixed part 2. It is thereby advantageously achieved that the deformation of the cardan ring 4 gives rise to preloading forces at the bearing locations of both parts 2 and 3, said forces being the same for both parts 2 and 3.

Figure 3:
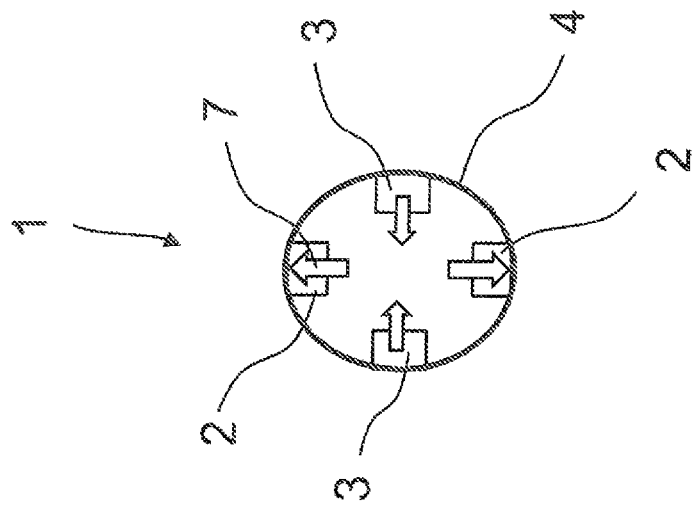
FIG. 3 shows a distribution of preloading forces on the cardan ring in accordance with the first illustrative embodiment, shown in FIG. 2, of the cardan mounting according to the invention.

FIG. 3 shows a distribution of the preloading forces 7, indicated by corresponding arrows, on the cardan ring 4 in accordance with the first illustrative embodiment, shown in FIG. 2, of the cardan mounting 1 according to the invention. Owing to the symmetry of the cardan ring 4, the preloading force 7 caused by the fixed part 2 on the cardan ring 4 deformed thereby (vertical direction in FIG. 3) gives rise to a preloading force 7 of the same magnitude for the moving part 3 (horizontal direction in FIG. 3). As a result, substantially the same forces, in particular frictional forces, act on the cardan ring 4 at all the bearing locations of parts 2 and 3. Moreover, both the fixed part 2 and the moving part 3 are clamped by the preloading forces 7 acting on the cardan ring 4, with the result that an additional means of securing parts 2 and 3 for the purpose of pivotable fixing on the cardan ring 4 can be omitted, reducing the components required to implement the cardan mounting 1 and significantly simplifying the construction thereof.

Figure 4:
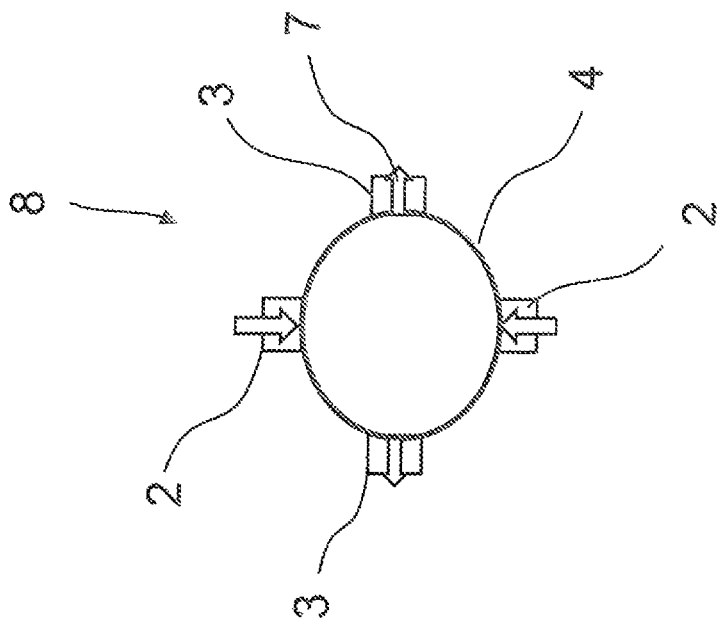
FIG. 4 shows a distribution of preloading forces on a cardan ring according to a second embodiment of a cardan mounting according to the invention.

FIG. 4 shows a distribution of preloading forces 7 on a cardan ring 4 in accordance with an alternative embodiment of a cardan mounting 8 according to the invention. Cardan mounting 8 differs from cardan mounting 1 essentially only in that both the fixed part 2 and the moving part 3 engage in the cardan ring 4 from the outside. The fixed part 2 (vertical direction in FIG. 4) thus now preferably causes compression of the cardan ring 4, as a result of which said ring is deformed in accordance with the illustration in FIG. 4. As has already been described above in connection with the explanation of FIG. 3, the preloading force 7 on the cardan ring 4 caused by the fixed part 2 gives rise to a preloading force 7 of the same magnitude for the moving part 3 (horizontal direction in FIG. 4) owing to the symmetry of the cardan ring 4. In this embodiment of the cardan mounting 8 too, it is the case that substantially the same forces, in particular frictional forces, act on the cardan ring 4 at all the bearing locations of parts 2 and 3. Moreover, both the fixed part 2 and the moving part 3 are clamped by the preloading forces 7 acting on the cardan ring 4, with the result that an additional means of securing parts 2 and 3 for the purpose of pivotable fixing on the cardan ring 4 can be omitted, likewise reducing the components required to implement the cardan mounting 8 and simplifying the construction thereof.

Figure 5:
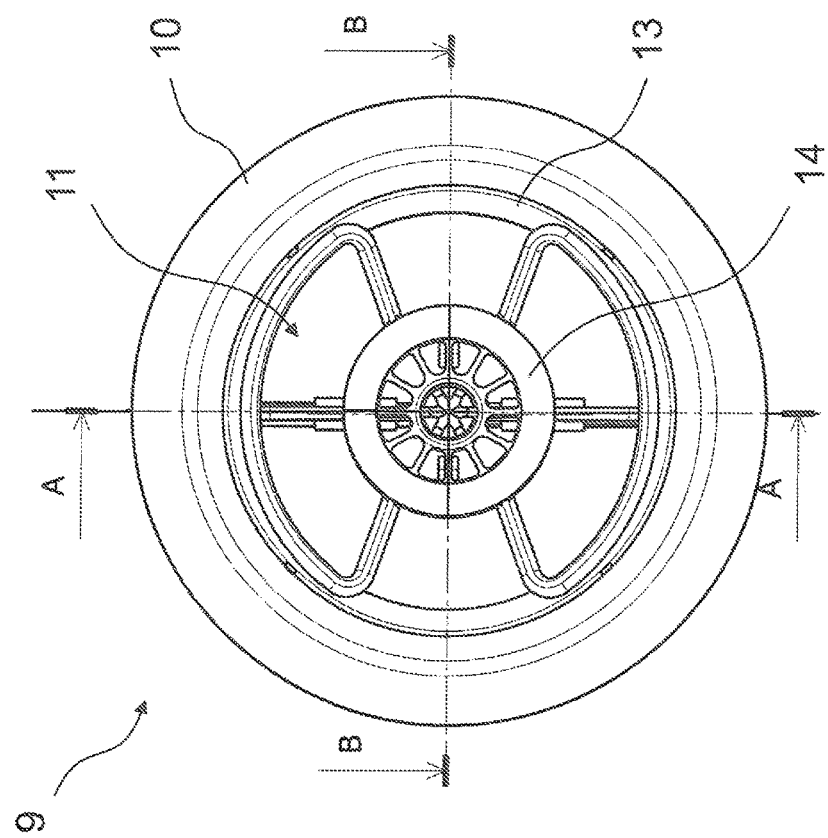
FIG. 5 shows a front view of an illustrative embodiment of an air vent according to the invention.

FIG. 5 represents a front view of an illustrative embodiment of an air vent 9 according to the invention for guiding an air stream out of an air feed line (not shown) in a heating, ventilation or air-conditioning system, particularly for passenger compartments in motor vehicles. The air vent 9 illustrated essentially comprises a housing 10 having a front air outflow opening 11 and a rear air inflow opening 12 (visible in FIG. 6) and an insert 13, which is arranged in the housing 10 and by means of which the direction and/or the intensity of the air stream emerging from the air vent 9 can be modified. In the air vent 9 illustrated in FIG. 5, the insert 13 is supported in the housing 10 by means of the cardan mounting 1 (not shown). The insert 13 of the air vent 9 illustrated in FIG. 5 furthermore has, in the front central region thereof, an adjusting means 14 for controlling the intensity of the air stream emerging from the air vent 9. The adjusting means 14 can advantageously be arranged unhindered in the central region of the insert 13 since the cardan mounting 1 (and also 8) according to the invention leaves sufficient free space, especially in the central region, as is clearly apparent in FIGS. 1 and 2. The transmission means 16 (visible in FIG. 6) which are required to control the intensity of the air stream by means of a control flap 15 (likewise visible in FIG. 6) and which are driven by the adjusting means 14 can then be arranged in said free space.

Figure 6:
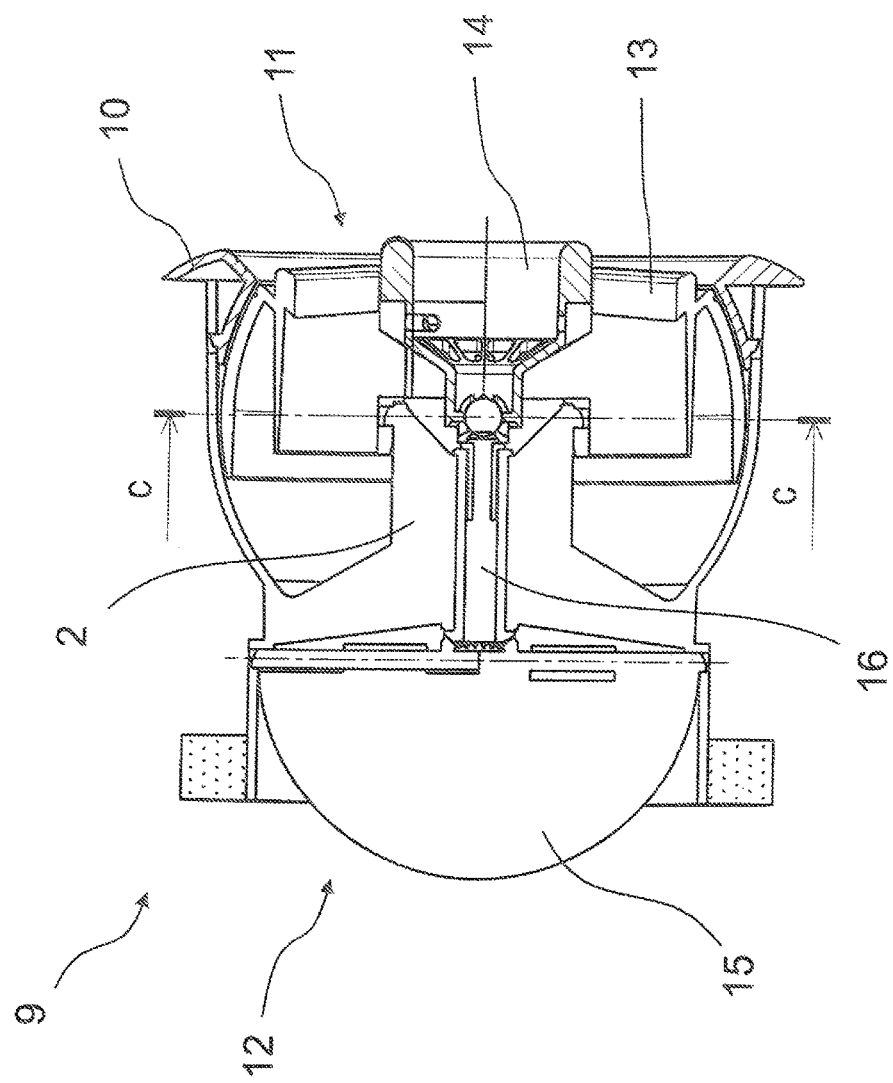
FIG. 6 shows a sectional view of the air vent from FIG. 5 along section line A-A.
Figure 7:
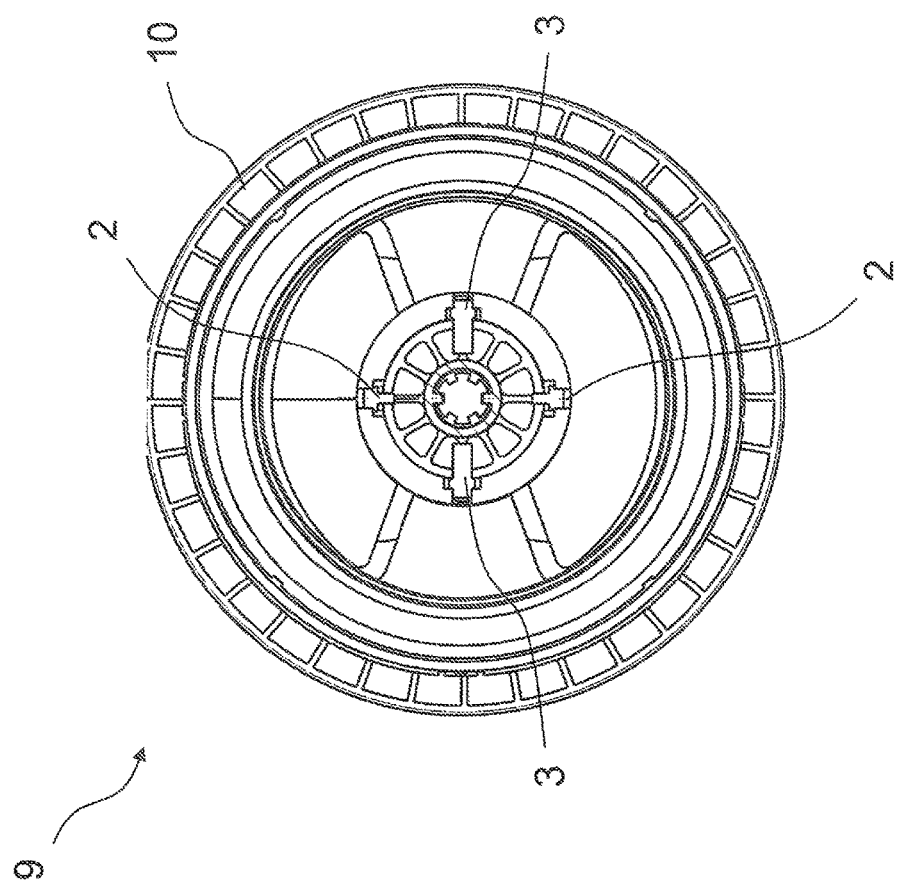
FIG. 7 shows a sectional view of the air vent from FIG. 6 along section line C-C.
Figure 8:
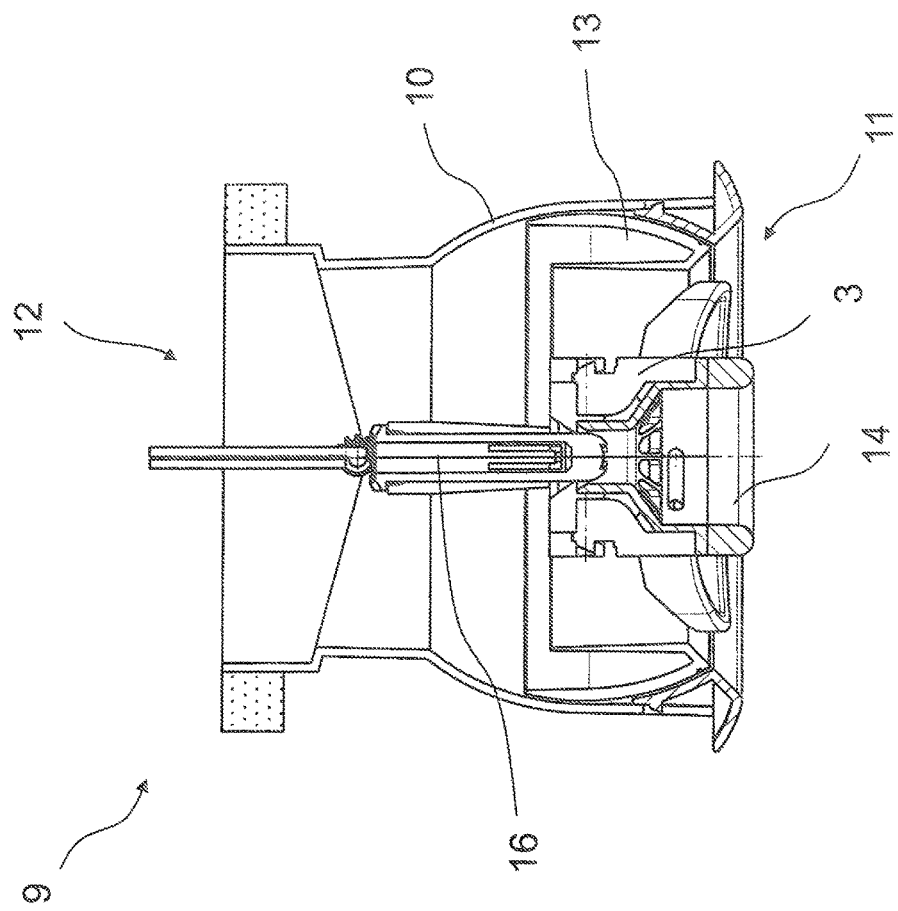
FIG. 8 shows a sectional view of the air vent from FIG. 5 along section line B-B.

FIGS. 6, 7 and 8 represent different sectional views of the air vent 9 shown in FIG. 5, wherein a sectional view of the air vent 9 from FIG. 5 along section line A-A is shown in FIG. 6, a sectional view of the air vent 9 from FIG. 6 along section line C-C is shown in FIG. 7, and a sectional view of the air vent 9 from FIG. 5 along section line B-B is shown in FIG. 8.

The cardan mounting according to the invention and the air vent according to the invention have been explained in detail by means of illustrative embodiments shown in the figures. However, the cardan mounting and the air vent are not restricted to the embodiments described herein but also include further embodiments with the same action.

In a preferred embodiment, the cardan mounting according to the invention is used in an air vent for guiding an air stream from an air feed line in a heating, ventilation or air-conditioning system, particularly for passenger compartments in motor vehicles.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cardan mounting for an air vent, comprising a fixed part having a first pin and a moving part having a second pin, which are each pivotably attached to a cardan ring via the respective first and second pins about two pivoting axes, wherein the two pivoting axes are arranged at right angles to one another, and wherein the cardan ring is elastically deformable and is extended along a first pivoting axis of said two pivoting axes and compressed along a second pivoting axis of said two pivoting axes in an installed state, as compared with an uninstalled state.

2. The cardan mounting as claimed in claim 1, wherein the fixed part or the moving part causes the extension or the compression of the cardan ring in the installed state.

3. The cardan mounting as claimed in claim 1, wherein the fixed part and the moving part both engage an inside of the cardan ring.

4. The cardan mounting as claimed in claim 1, wherein the fixed part and the moving part both engage an outside of the cardan ring.

5. The cardan mounting as claimed in claim 1, wherein the fixed part and the moving part each engage in the cardan ring by means of pivots.

6. The cardan mounting as claimed in claim 1, wherein the cardan ring has a circular ring shape.

7. An air vent for guiding an air stream out of an air feed line in a heating, ventilation or air-conditioning system for passenger compartments in motor vehicles, comprising a housing having a front air outflow opening and a rear air inflow opening and an insert, which is arranged in the housing and by means of which a direction and/or an intensity of the air stream emerging from the air vent can be modified, wherein the insert is supported in the housing by means of a cardan mounting as set forth in claim 1.

8. The air vent as claimed in claim 7, wherein in a front central region, the insert has an adjusting means for controlling intensity of the air stream emerging from the air vent.

9. An air vent for guiding an air stream out of an air feed line in a heating, ventilation or air-conditioning system for passenger compartments in motor vehicles, comprising a housing having a front air outflow opening and a rear air inflow opening and an insert, which is arranged in the housing and by means of which a direction and/or an intensity of the air stream emerging from the air vent can be modified, wherein the insert is supported in the housing by means of a cardan mounting as set forth in claim 2.

10. The air vent as claimed in claim 9, wherein in a front central region, the insert has an adjusting means for controlling intensity of the air stream emerging from the air vent.

11. An air vent for guiding an air stream out of an air feed line in a heating, ventilation or air-conditioning system for passenger compartments in motor vehicles, comprising a housing having a front air outflow opening and a rear air inflow opening and an insert, which is arranged in the housing and by means of which a direction and/or an intensity of the air stream emerging from the air vent can be modified, wherein the insert is supported in the housing by means of a cardan mounting as set forth in claim 3.

12. The air vent as claimed in claim 11, wherein in a front central region, the insert has an adjusting means for controlling intensity of the air stream emerging from the air vent.

13. An air vent for guiding an air stream out of an air feed line in a heating, ventilation or air-conditioning system for passenger compartments in motor vehicles, comprising a housing having a front air outflow opening and a rear air inflow opening and an insert, which is arranged in the housing and by means of which a direction and/or an intensity of the air stream emerging from the air vent can be modified, wherein the insert is supported in the housing by means of a cardan mounting as set forth in claim 4.

14. The air vent as claimed in claim 13, wherein in a front central region, the insert has an adjusting means for controlling intensity of the air stream emerging from the air vent.

15. An air vent for guiding an air stream out of an air feed line in a heating, ventilation or air-conditioning system for passenger compartments in motor vehicles, comprising a housing having a front air outflow opening and a rear air inflow opening and an insert, which is arranged in the housing and by means of which a direction and/or an intensity of the air stream emerging from the air vent can be modified, wherein the insert is supported in the housing by means of a cardan mounting as set forth in claim 5.

16. The air vent as claimed in claim 15, wherein in a front central region, the insert has an adjusting means for controlling intensity of the air stream emerging from the air vent.

17. An air vent for guiding an air stream out of an air feed line in a heating, ventilation or air-conditioning system for passenger compartments in motor vehicles, comprising a housing having a front air outflow opening and a rear air inflow opening and an insert, which is arranged in the housing and by means of which a direction and/or an intensity of the air stream emerging from the air vent can be modified, wherein the insert is supported in the housing by means of a cardan mounting as set forth in claim 6.

18. The air vent as claimed in claim 17, wherein in a front central region, the insert has an adjusting means for controlling intensity of the air stream emerging from the air vent.

* * * * *